United States Patent
Yao

(10) Patent No.: US 8,540,599 B2
(45) Date of Patent: Sep. 24, 2013

(54) FULL-ROLLER TRANSMISSION STRUCTURE

(76) Inventor: Tsun Tien Yao, Taichung (TW)

(*) Notice: Subject to any disclaimer, the term of this patent is extended or adjusted under 35 U.S.C. 154(b) by 68 days.

(21) Appl. No.: 13/365,271

(22) Filed: Feb. 3, 2012

(65) Prior Publication Data

US 2013/0203545 A1    Aug. 8, 2013

(51) Int. Cl.
*F16H 1/32* (2006.01)

(52) U.S. Cl.
USPC .......................................................... 475/176

(58) Field of Classification Search
USPC ................................................. 475/162–180
See application file for complete search history.

(56) References Cited

U.S. PATENT DOCUMENTS

| | | | | |
|---|---|---|---|---|
| 1,873,380 A * | 8/1932 | Gibson | ......................... | 475/159 |
| 3,979,167 A * | 9/1976 | Grove | ......................... | 418/61.3 |
| 4,545,263 A * | 10/1985 | Fickelscher | ..................... | 74/640 |
| 5,209,637 A * | 5/1993 | Reubeuze | ..................... | 475/176 |
| 7,351,177 B2 * | 4/2008 | Christ | ............................ | 475/168 |

* cited by examiner

*Primary Examiner* — Tisha Lewis

(57) ABSTRACT

A full-roller transmission structure comprises a housing, a first disk, a second disk, a rear disk, a front disk, and an input shaft. The housing includes a rear cover, an annular shell, and a front ring, which are detachably coupled together. Multiple inner rollers are disposed on an inner surface of the annular shell. The first and second disks are mounted in the annular shell and respectively provided with a plurality of first and second outer rollers capable of acting on the inner rollers. The rear disk is mounted between the first disk and the rear cover. Joining bolts and joining pins are employed to join the above disks. The input shaft includes a first eccentric journal for the first disk and a second eccentric journal for the second disk, the first eccentric journal being offset from the second eccentric journal at an angle of about 180 degrees.

5 Claims, 4 Drawing Sheets

FULL-ROLLER TRANSMISSION STRUCTURE

TECHNICAL FIELD OF THE INVENTION

The present invention relates to a full-roller transmission structure and, more particularly, to a full-roller transmission structure, whereby the housing thereof can be driven to rotate in slow speed to achieve the purpose of speed reduction.

DESCRIPTION OF THE PRIOR ART

In conventional planetary transmission, cycloidal disks are widely employed, wherein the teeth of gears are profiled using curtate cycloids. This type of planetary transmission may cause complexity in the manufacturing of gears and difficult in controlling the accuracy or precision of gears. Besides, in such gears, the teeth are prone to be damaged, and stress concentrations are prone to occur.

A conventional speed reducer, as disclosed in U.S. Pat. No. 5,431,605, is related to a transmission device employing roller means, which generally comprises a casing, an eccentric rod to be connected with a high-speed shaft, a plurality of shaft pins disposed in pinion rollers respectively and connected with an output shaft, a roller-keeping ring for confining the pinion rollers, and a plurality of rollers mounted to the casing. Thereby, the eccentric rod can be driven by the high-speed shaft to rotate the output shaft and thus achieve the purpose of speed reduction.

However, the above invention requires more components and is complicated in structure due to the output shaft. Besides, the overall thickness of the above invention is too large, so that it cannot meet the market trend of a thin design. Therefore, there is a need for improvement.

SUMMARY OF THE INVENTION

The primary object of the present invention is to provide a full-roller transmission structure that can have the effect of reducing speed without employing an output shaft as a component thereof, so that it can save components and have a simple construction, so that it can reduce the overall thickness and the manufacturing cost, so as to meet the market trend of a thin design.

To achieve the above object, the present invention provides a full-roller transmission structure, which comprises a housing including a rear cover, an annular shell, and a front ring.

The above object and advantage of the present invention can be fully understood from the following detailed description with reference to the accompanying drawings.

Although a preferred embodiment is taken for illustration of the present invention, the parts or arrangement thereof may be different from the embodiment without departing the spirit of the present invention.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
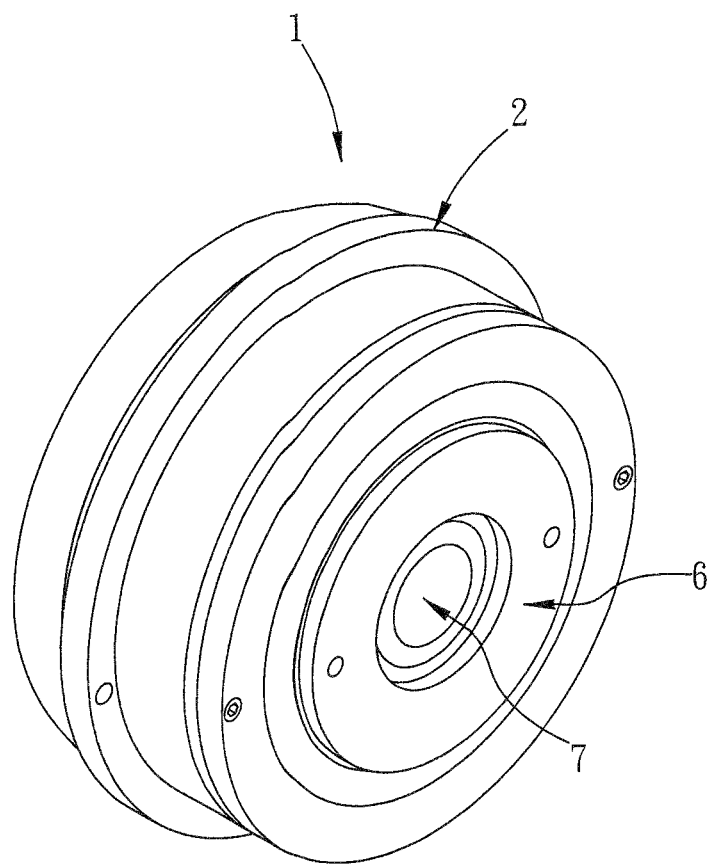
FIG. 1 shows a 3-dimensional view of a full-roller transmission structure of the present invention.
Figure 2:
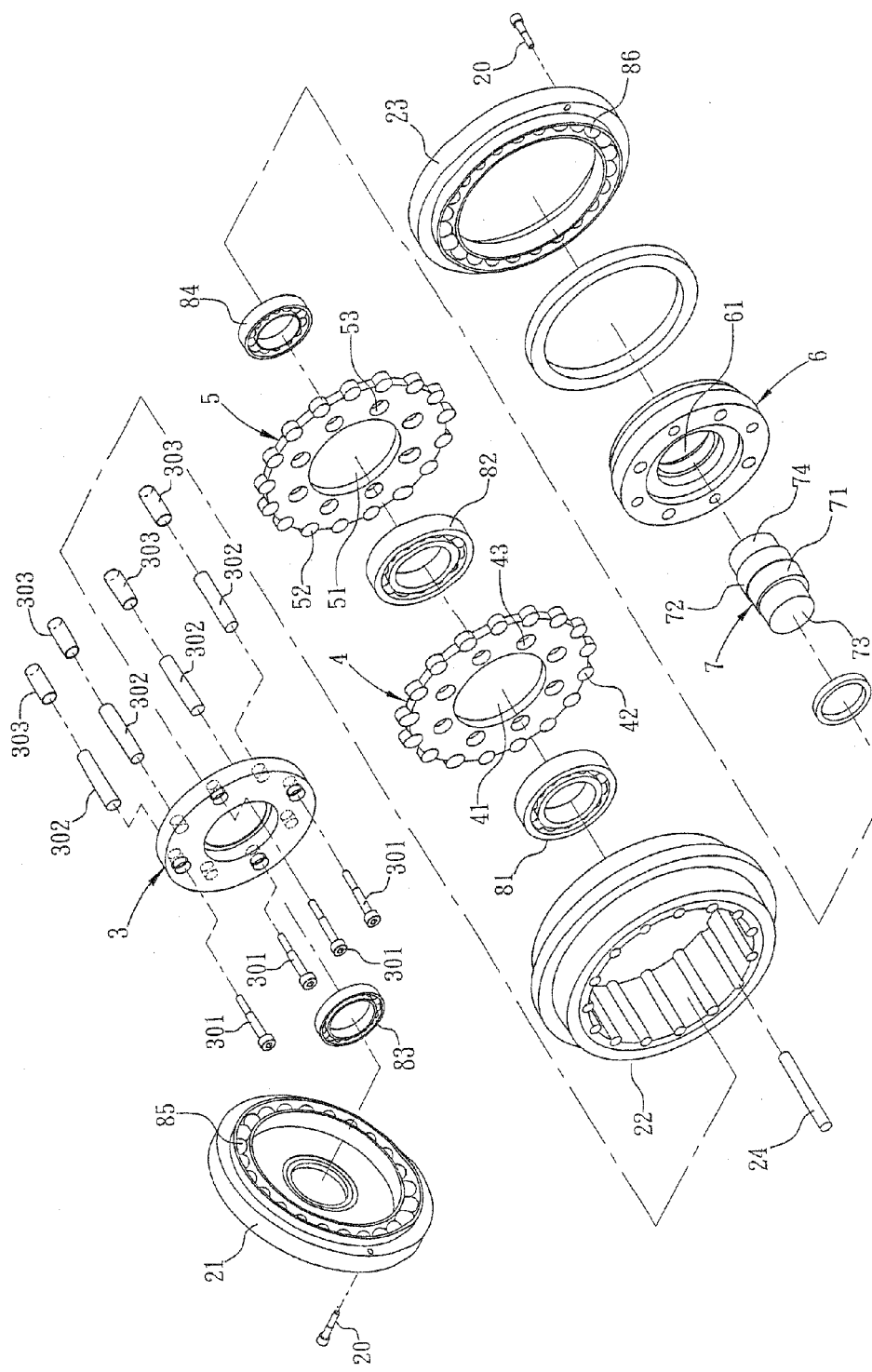
FIG. 2 shows an exploded view of the full-roller transmission structure of the present invention.
Figure 3:
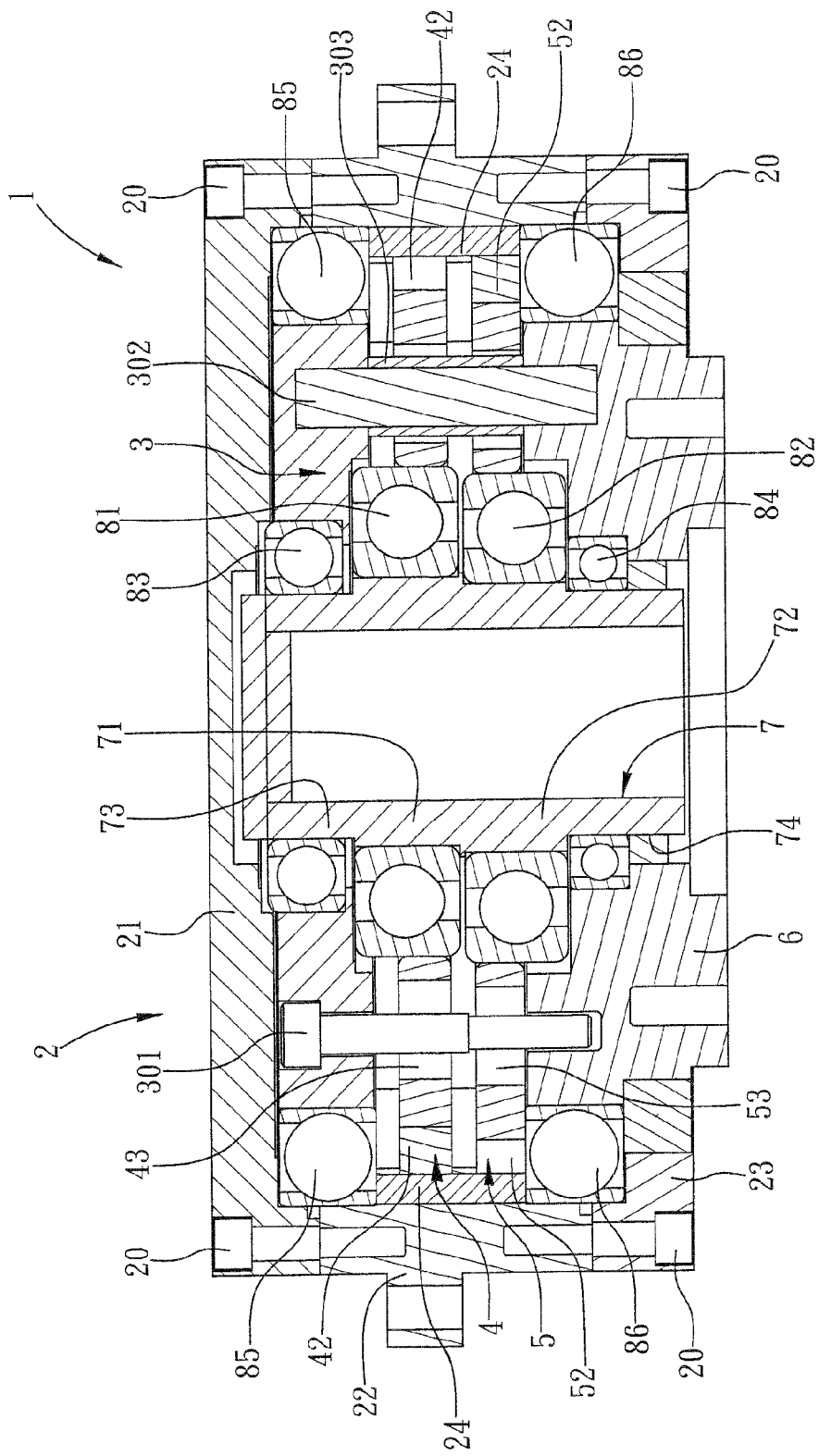
FIG. 3 shows a sectional view of the full-roller transmission structure of the present invention.
Figure 4:
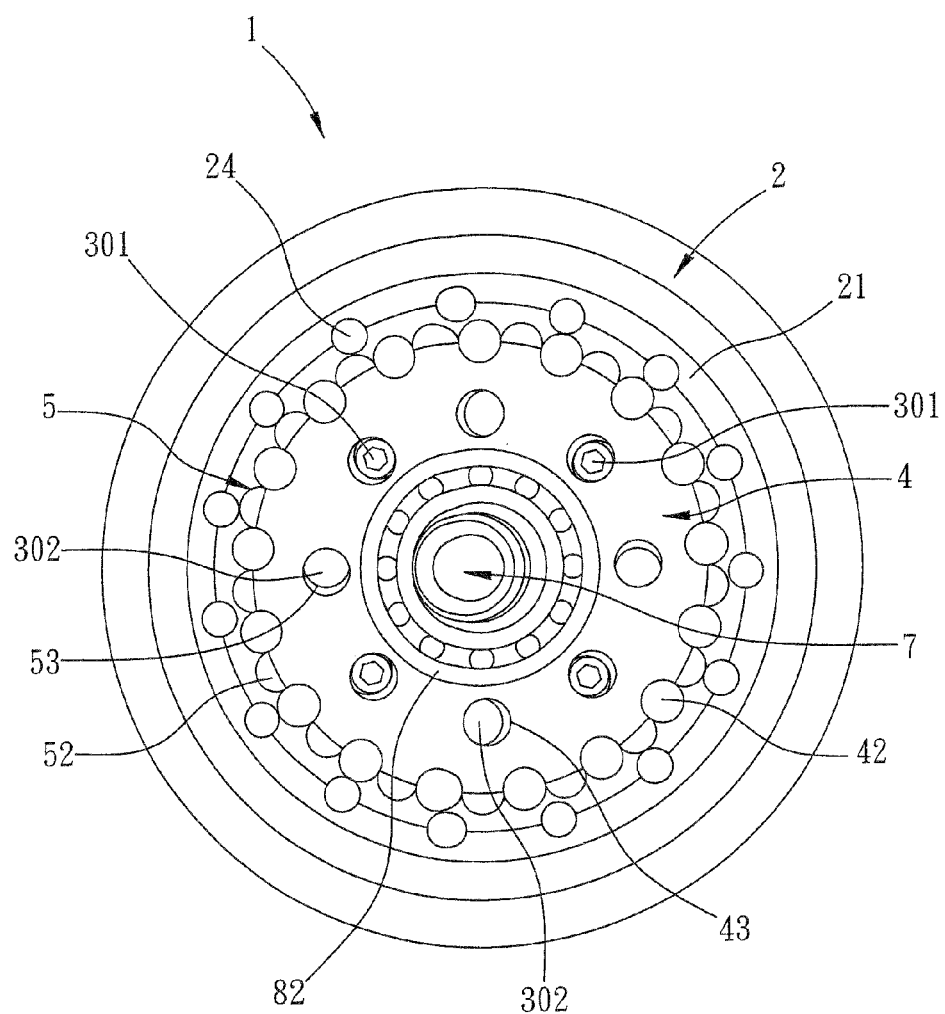
FIG. 4 shows a plan view of the full-roller transmission structure of the present invention.

Referring to FIGS. 1-4, the present invention relates to a full-roller transmission structure, indicated by reference numeral 1, which generally comprises a housing 2, a rear disk 3, a first disk 4, a second disk 5, a front disk 6, and an input shaft 7.

The housing 2 includes a rear cover 21, an annular shell 22, and a front ring 23. Two opposing sides of the annular shell 22 are respectively coupled to the rear cover 21 and the front ring 23, wherein the rear cover 21, the annular shell 22 and the front ring 23 are detachably coupled together by using a plurality of coupling bolts 20, or the rear cover 21, the annular shell 22 and the front ring 23 are formed into an integral body by other methods, and wherein a plurality of inner rollers 24 are disposed on an inner surface of the annular shell 22 at an equal angular interval.

The rear disk 3 is mounted in the housing 2 between the first disk 4 and the rear cover 21.

As shown, the first disk 4 has the same structure as the second disk 5.

The first disk 4 is mounted in the annular shell 22, adjacent to the rear cover 21, wherein the first disk 4 is provided with a plurality of first outer rollers 42 on a circumference thereof. The first outer rollers 42 are arranged at an equal angular interval with respect to the center of the first disk 4 and can act on the inner rollers 24. Also, the first disk 4 defines a first shaft hole 41 at a center thereof and at least two first through holes 43 being arranged at angular intervals or at an equal angular interval with respect to the center of the first disk 4.

The second disk 5 is mounted in the annular shell 22, adjacent to one side of the first disk 4 away from the rear cover 21, wherein the second disk 5 is provided with a plurality of second outer rollers 52 on a circumference thereof. The second outer rollers 52 are arranged at an equal angular interval with respect to the center of the second disk 5 and can act on the inner rollers 24. Also, each first outer roller 42 is angularly offset from a corresponding second outer roller 52 so that each of the first outer rollers 42 is placed between two of the second outer rollers 52. The second disk 5 defines a second shaft hole 51 at a center thereof being coaxially with the first shaft hole 41 of the first disk 4. The second disk 5 defines at least two second through holes 53 being arranged at angular intervals or an equal angular interval with respect to the center of the second disk 5. The second through holes 53 of the second disk 5 correspond to the first through holes 43 of the first disk 4 respectively.

The front disk 6 is mounted in the housing 2, adjacent to one side of the second disk 5 away from the first disk 4, wherein the front disk 6 defines a third shaft hole 61 at a center thereof being coaxial with the first shaft hole 41 of the first disk 4 and the second shaft hole 51 of the second disk 5. Also, at least two joining bolts 301 and at least two joining pins 302 (although the drawings show four pieces of joining bolts and four pieces of joining pins for illustration, this does not limit the present invention) are arranged at an equal angular interval to be fitted with the rear disk 3, and inserted through the first through holes 41 of the first disk 4 and the second through holes 51 of the second disk 5 to be fitted with the front disk 6. Each of the joining bolts 301 is placed between two of the joining pins 302. Each joining bolt 301 has a diameter less than each first through hole 41 of the first disk 4 and each second through hole 52 of the second disk 5. Also, each joining pin 302 has a diameter less than each first through hole 41 of the first disk 4 and each second through hole 52 of the second disk 5. Thereby, the first disk 4 and the second disk 5 can conduct planetary motions respectively, which can cause the outer rollers 42 of the first disk 4 and the outer rollers 52 of the second disk 5 being eccentrically engaged with the inner rollers 24 in substantially opposite locations, so as to drive the annular shell 22 or the housing 2 to rotate.

Furthermore, each joining pin 302 is enclosed with a bush 303 in a respective first through hole 43 of the first disk 4 and a respective second through hole 53 of the second disk 5, so as to reduce the frictions between each joining pin 302 and the disk 4, 5.

The input shaft 7 includes a first eccentric journal 71 and a second eccentric journal 72 adjacent to the first eccentric journal 71, wherein the eccentricity of the first eccentric journal 71 is offset from the eccentricity of the second eccentric journal 72 at an angle of about 180 degrees. Also, the input shaft 7 is insert through the first shaft hole 41 of the first disk 4 and the second shaft hole 51 of the second disk 5, wherein the first eccentric journal 71 is located corresponding to the first shaft hole 41 of the first disk 4, the second eccentric journal 72 is located corresponding to the second shaft hole 52 of the second disk 5. Furthermore, the input shaft 7 includes a first concentric journal 73 and a second concentric journal 74. The first concentric journal 73 extends outwardly from the first eccentric journal 71, whereas the second concentric journal 74 extends outwardly from the second eccentric journal 72. The first concentric journal 73 is located corresponding to the rear disk 3, whereas the second concentric journal 74 is located corresponding to the front disk 6.

Also, a first bearing 81 is mounted between the first eccentric journal 71 and the first disk 4; a second bearing 82 is mounted between the second eccentric journal 72 and the second disk 5; a third bearing 83 is mounted between the first concentric journal 73 and the rear disk 3; a fourth bearing 84 is mounted between the second concentric journal 74 and the front disk 6.

Furthermore, a fifth bearing 85 is mounted between the rear disk 3 and the housing 2, whereas a sixth bearing 86 is mounted between the front disk 6 and the housing 2.

As a summary, the joining bolts 301 and the joining pins 302, which are arranged at an equal angular interval with respect to the input shaft 7, are inserted through the first through holes 43 of the first disk 4 and the second through holes 53 of the fifth disk 5 so as to join the disks 3, 4, 5, 6 together, wherein the diameters of the joining bolts 301 and the joining pins 302 are less than those of the through holes 43, 53 of the disks 4, 5; the first eccentric journal 71 and the second eccentric journal 72 are offset at a predetermined angle, preferably about 180 degrees. Accordingly, in operation, when a shaft of a motor (not shown in the drawings) is inserted into the input shaft 7 for driving it to rotate, the first disk 4 and the second disk 5 can be driven by the first bearing 81 and the second bearing 82 through the first eccentric journal 71 and the second eccentric journal 72 to conduct planetary motions respectively, whereby the housing 2 can be driven to rotate in a reduced speed by the inner rollers 24 which are engaged with the first outer rollers 42 of first disk 4 and the second outer rollers 52 of the second disk 5.

Although the present invention has been described with a certain degree of particularity, it is understood that the present disclosure is made by way of example only and the combination and arrangement of parts may be resorted to without departing from the spirit and scope of the invention hereinafter claimed.

I claim:

1. A full-roller transmission structure, comprising:
a housing including a rear cover, an annular shell, and a front ring, wherein two opposing sides of said annular shell is coupled to said rear cover and said front ring respectively, said rear cover, said annular shell and said front ring being detachably coupled together by using a plurality of coupling bolts, or said rear cover, said annular shell and said front ring being formed into an integral body, and wherein a plurality of inner rollers are disposed on an inner surface of said annular shell at an equal angular interval;
a first disk mounted in said annular shell, adjacent to said rear cover, wherein said first disk is provided with a plurality of first outer rollers on a circumference thereof, said first outer rollers being arranged at an equal angular interval and capable of acting on said inner rollers, and wherein said first disk defines a first shaft hole at a center thereof and at least two first through holes being arranged at angular intervals;
a second disk mounted in said annular shell, adjacent to one side of said first disk away from said rear cover, wherein said second disk is provided with a plurality of second outer rollers on a circumference thereof, said second outer rollers being arranged at an equal angular interval and capable of acting on said inner rollers, each said first outer roller being angularly offset from a corresponding second outer roller so that each of said first outer rollers is placed between two of said second outer rollers, and wherein said second disk defines a second shaft hole at a center thereof being coaxially with said first shaft hole of said first disk, and defines at least two second through holes being arranged at angular intervals and corresponding to said first through holes of said first disk respectively;
a rear disk mounted in said housing between said first disk and said rear cover;
a front disk mounted in said housing, adjacent to one side of said second disk away from said first disk, wherein said front disk defines a third shaft hole at a center thereof being coaxial with said first shaft hole of said first disk and said second shaft hole of said second disk, and wherein at least two joining bolts and at least two joining pins are arranged at an equal angular interval to be fitted with said rear disk, and inserted through said first through holes of said first disk and said second through holes of said second disk to be fitted with said front disk, each of said joining bolts being placed between two of said joining pins, each said joining bolt having a diameter less than each said first through hole of said first disk and each said second through hole of said second disk, each said joining pin having a diameter less than each said first through hole of said first disk and each said second through hole of said second disk; and
an input shaft including a first eccentric journal and a second eccentric journal adjacent to said first eccentric journal, the eccentricity of said first eccentric journal being offset from the eccentricity of said second eccentric journal at an angle of about 180 degrees, said input shaft being insert through said first shaft hole of said first disk and said second shaft hole of said second disk, said first eccentric journal being located corresponding to said first shaft hole of said first disk, said second eccentric journal being located corresponding to said second shaft hole of said second disk.

2. The full-roller transmission structure of claim 1, wherein said input shaft further includes a first concentric journal and a second concentric journal, said first concentric journal extending outwardly from said first eccentric journal, said second concentric journal extending outwardly from said second eccentric journal, said first concentric journal being located corresponding to said rear disk, said second concentric journal being located corresponding to said front disk.

3. The full-roller transmission structure of claim 2, wherein a first bearing is mounted between said first eccentric journal and said first disk, a second bearing is mounted between said second eccentric journal and said second disk, a third bearing is mounted between said first concentric journal and said rear disk, and a fourth bearing is mounted between said second concentric journal and said front disk.

4. The full-roller transmission structure of claim 3, wherein a fifth bearing is mounted between said rear disk and said housing, and a sixth bearing is mounted between said front disk and said housing.

5. The full-roller transmission structure of claim 1, wherein each said joining pin is enclosed with a bush.

* * * * *